United States Patent Office 3,493,335
Patented Feb. 3, 1970

3,493,335
PROCESS FOR THE PREPARATION OF ACTIVE CUPROUS HALIDE SORBENTS
Richard J. DeFeo and Jesse M. Carr, Jr., Baton Rouge, Gerald A. Byars, Denham Springs, and Werner A. Bauch, Baton Rouge, La., assignors to Esso Research and Engineering Company, a corporation of Delaware
No Drawing. Filed Sept. 19, 1966, Ser. No. 580,160
The portion of the term of the patent subsequent to Nov. 12, 1985, has been disclaimed
Int. Cl. C01g *3/04;* C01b *9/00*
U.S. Cl. 23—97                                      25 Claims

ABSTRACT OF THE DISCLOSURE

A process for preparing active cuprous halide sorbents from the corresponding raw, inactive cuprous halide salts. A raw salt is slurried in an organic medium containing at least 10 wt. percent of an inert, liquid paraffin diluent. The slurry is then contacted, in liquid phase, with a ligand capable of forming, with the salt, a stable complex having a molar ratio of copper-to-ligand greater than 1:1. The active sorbent is then formed by subjecting the complex to temperature and pressure conditions sufficient to decomplex the cuprous halide and the ligand, the latter in liquid state. The salt, thus activated, is capable of further independent and more efficient use as sorbents for separation of the same or different ligands from hydrocarbon mixtures.

---

This invention is directed to an all liquid slurry process for directly converting (commercial) raw cuprous halide salts selected from the group consisting of cuprous chloride, cuprous bromide and cuprous iodide having unacceptable sorptive capacity to highly sorption-active cuprous halide sorbents eminently suitable for highly efficient and extended use in separation and recovery of complexable ligands from mixtures containing them.

More specifically the present invention is directed to an all slurry process for directly preparing sorption-active cuprous halide sorbents from the corresponding raw cuprous chloride, bromide or iodide salts by (1) contacting (A) a slurry of raw cuprous halide salt particles selected from the group consisting of cuprous chloride, cuprous bromide and cuprous iodide in a liquid organic slurry diluent containing at least 10 wt. percent of an inert, liquid paraffin diluent in which said cuprous halide is essentially insoluble, said liquid organic slurry medium containing said paraffin being incapable of dissolving more than about 5 wt. percent of cuprous halide salt at complexing-decomplexing conditions with (B) a conditioning ligand capable of forming a stable complex with said cuprous halide having a mole ratio of copper-to-conditioning ligand of greater than 1:1, at temperature and pressure conditions suitable for liquid phase complexation, said liquid inert diluent having a higher boiling point than said conditioning ligand and (2) thereafter subjecting said cuprous halide-conditioning ligand complex particles to temperatures and pressure conditions sufficient to decomplex said particles while retaining said inert diluent in the liquid state thereby resulting in a release of said conditioning ligand from said particles and effecting conversion of said raw salt to sorption-active sorbent.

Preferably, the lquid slurry medium contains a monoolefin(s) in addition to the liquid inert paraffin diluent. Said monoolefin(s) can, and usually do, have $$C_n{}^{+4}_{-2}$$

carbon atoms wherein the conditioning ligand has $n$ carbon atoms. In other words the monoolefin can have from two less carbon atoms than the conditioning ligand to four more carbon atoms than the conditioning ligand. In such cases the conditioning ligand is one which is always preferentially sorbed by said cuprous halide compared to said monoolefin(s). For example, where the conditioning ligand is 1,3-butadiene, it can be fed as a commercial 1,3-butadiene-containing refinery $C_4$ stream having 1,3-butadiene and butenes, viz., butene-1, isobutylene and butene-2 plus other components, e.g., butanes, acetylenes, etc., present in comparatively small amounts. The 1,3-butadiene is preferentially complexed (sorbed) compared to the butenes and other components. The presence of the $$C_n{}^{+4}_{-2}$$

monoolefin(s) in the liquid slurry medium is preferred because such monoolefin(s) accelerate the rate at which the complexation takes place in the liquid phase between said cuprous halide salt particles and said conditioning ligand. In such cases, it is also preferable (but not essential) to remove the $$C_n{}^{+4}_{-2}$$

monoolefin(s) in the presence of said liquid inert diluent after complexation of said cuprous halide salt but prior to the decomplexation thereof. This pre-decomplexing removal of said monoolefins is preferable because their presence can cause some loss of sorbent capacity with a disproportionately large decrease in activity level at the decomplexation conditions, possibly due to a small solubilization and other deleterious phenomena at these conditions. The temperature and pressure conditions employed for removal of said $$C_n{}^{+4}_{-2}$$

monoolefin(s) are insufficient to cause substantial decomplexation of said cuprous halide-conditioning ligand complex particles.

While it is preferable to have said $$C_n{}^{+4}_{-2}$$

monoolefin(s) present during liquid phase complexation of said cuprous halide salt particles, this is not essential; and it should be clearly understood that the conditioning ligand can be supplied in concentrated or even essentially pure form within the purview of this invention. The conditioning ligand, whether in pure form or in admixture with said monoolefin(s) can be supplied to the raw cuprous halide salt inert liquid diluent slurry in gaseous or liquid form as long as the complexation takes place in the liquid phase while said diluent is maintained in liquid phase. When the conditioning ligand is fed as a gas, it is immediately liquefied upon contact with the cuprous halide salt-inert liquid paraffin diluent slurry; and the complexation is conducted under temperature and pressure conditions suitable for liquid phase complexation viz. temperatures of about —20 to about 150° F. and sufficient pressures to maintain liquid phase complexing. The inert, liquid paraffin diluent is one in which the cuprous halide-conditioning ligand complex particles are essentially insoluble, the raw cuprous halide salt particles are essentially insoluble, and which has a higher boiling point than said conditioning ligand.

Prior to the present invention, sorption-active cuprous halide sorbents were prepared largely by solution processes involving first dissolving the raw cuprous halide salt in a suitable solvent, e.g., a monoolefin solvent usually at low temperatures; filtering the solution to remove insoluble residues; contacting the thus prepared cuprous halide solution with a conditioning ligand (usually in gaseous form) to secure insoluble complex particles; drying the cuprous halide conditioning ligand complex particles to remove residual liquids therefrom; and thermally decomplexing the dried particles at elevated temperatures to release the conditioning ligands and form the active cuprous halide sorbents.

These solution-based processes suffer from several drawbacks. For example, it is usually necessary in forming the cuprous halide solutions to cool the solvent substantially below ambient temperatures, e.g., 0° F. and even lower, and to maintain this temperature during the period of time necessary to dissolve the cuprous halid salt. This is not only time consuming, but expensive due to the costs of supplying refrigeration to cool the solvent and salt and maintain them cool. Maintenance problems in the dissolving tank(s) can further hinder these prior art solution processes due to the customary practice of using a large number of small diameter heat exchanger tubes to effect refrigeration. These tubes are arranged in bundles and the tube bundles can become clogged easily. In such cases, they must be cleaned periodically and this cleaning results in stoppages for periodically required maintenance. This in turn hampers continuous overall operations and necessitates additional dissolving apparatus to handle processing during maintenance shutdowns.

Furthermore, these prior art solution-based sorbent preparation processes are severely limited by the amount of cuprous halide salt which can be effectively dissolved in the given solvent. Usually, it is difficult to get more than about 10 to 20 wt. percent cuprous halide salt dissolved in the essentially pure monoolefin solvents which tend to give the higher quality active sorbent material. In any event each of the monoolefin solvents seems to have its own solubility level, and attempts to exceed this can result in reduced quality sorbent, substantial decrease in particle size of the active sorbent, and other deleterious effects. The inability to dissolve more than a rather small amount of cuprous halide salts results in taking a longer time to prepare a given amount of active sorbent using such prior art solution-based processes than the process of this invention; or stated alternatively to produce a given amount of active sorbent in a given time. A larger volume of solvent must be handled, pumped, filtered, etc., in prior art processes than inert liquid (non-solvent) diluent of the present invention. The increased costs (due to the increased solvent inventory, higher refrigeration requirements, and equipment necessary for handling it) constitute economic drawbacks to the solution-based processes.

Another drawback encountered in solution-based sorbent preparation procedures resides in the necessary practice of filtering the cuprous halide solution to remove even fines and small particulate insoluble residua after dissolving of the cuprous halide salt and prior to the complexation thereof. If these cuprous halide solutions are not filtered, the salt fines, undissolved residua, etc., can cause a disproportionately large amount of complex fines when unfiltered cuprous halide solutions are complexed with a conditioning ligand. In this regard, undissolved cuprous halide and residual fines usually beget more complex fines after complexation than present before complexation. These complex fines in turn beget active sorbent fines (which are considered undesirable, esp., for fluidizd bed separation and recovery processes using active cuprous halide sorbents). Such fines are undesirable not only because they rapidly elutriate from fluidized beds, but also because they have poor retention of their initial high sorptive capacity. The requisite solution filtration requires close control and further increases the cost of producing active sorbent.

A still further disadvantage of solution-based sorbent preparation processes resides in the difficulty of controlling the often unpredictable relationship between the particle size of the raw cuprous halide salt and the particle size of the active sorbent particles. In certain instances the average particle size substantially increases during the preparation process; in others it decreases substantially. While the exact causes of these changes are not known, the dissolving and complexing from solution steps are suspected as the primary problem areas. In any event, it is difficult when preparing active sorbent by solution-based processes to meet a given particle size target requirement.

These and other problems are substantially overcome or minimized by the all slurry sorbent preparation process of the present invention which: usually operates at temperatures closer to ambient temperatures (thus saving on refrigeration costs and equipment); allows for handling a much higher concentration of cuprous halide salt based on total liquid and a much higher volume of cuprous halide salt in a given period of time with a given amount of equipment than can be secured in solution-based procedures (thus saving on liquid inventory and equipment costs); does not require filtration of any liquid (thus saving on filtration time and costs); and substantially assures control over the particle size of the prepared active sorbent because the active sorbent particles will have approximately the same particle size and particle size distribution as that of the raw cuprous halide salt (thus imparting both specificity and flexibility to the sorbent preparation process).

In addition to these advantages, the present invention has two other salient advantages. The first of these is that the active cuprous halide sorbent solids of this invention permit the recovery of a higher purity ligand product when said sorbents are employed to recover ligands from mixtures, esp., by slurry-based recovery processes. A valuable example of this advantage has been demonstrated in the recovery of 1,3-butadiene from a $C_4$ refinery stream containing close boiling butenes and butanes. The 1,3-butadiene recovered using a cuprous chloride sorbent prepared according to this invention contained considerably less impurities, esp., those which are rather difficult to remove such as vinyl acetylene, than 1,3-butadiene recovered using the same recovery process but employing sorbent prepared by a solution-based process. Another very important advantage of the present invention resides in the sorbent's ability to retain its sorptive capacity. The active cuprous halide sorbents prepared by this all slurry process maintain a high sorptive capacity for extended time periods over repeated use (in recovering ligands from mixtures containing them), especially when the ligand recovery process is an organic diluent liquid slurry-based procedure.

These and other advantages of this invention will be apparent from the detailed description of the process which follows:

The cuprous halide salts which can be employed herein include cuprous chloride, cuprous bromide, and cuprous iodide. Generally, it is advisable to use a cuprous halide salt which is fairly pure, viz., a cuprous halide salt having a purity of 90+%; but cuprous halide salts having lower purities can be used. Usually, the purity of the cuprous halide salt ranges from about 95 to 100%, and preferably from 99 to 100%. The cuprous halide salt should be fairly dry, i.e., contain less than 1.0 wt. percent moisture at the time it is added to the inert liquid slurry medium. While the particle size of the raw cuprous halide salt can be varied widely within the purview of this invention, to yield practically any desired particle size active cuprous halide sorbent; usually the particle size of the raw cuprous halide salt lies within the range of about 0.1 to 500 microns. When it is desired to produce active cuprous halide sorbent in accordance with the practice of this invention, suitable for use in slurry-based ligand recovery processes, the raw cuprous halide salts usually have particle sizes of about 5 to about 200 microns thus leading to the preparation of active cuprous halide sorbents having the corresponding average particle sizes.

The inert, organic liquid diluents employed in accordance with the practice of this invention are substantially inert both with respect to the cuprous halide salt, the cuprous halide-conditioning ligand complex, and the conditioning ligand employed. The slurry liquid diluent should contain at least 10 wt. percent of a liquid inert paraffin diluent at the outset of the process, viz., prior to and during complexing operation. Of course, the concentration of the liquid inert paraffin diluent in the liquid slurry medium will increase during the monoolefin removal and decomplexing operations if the liquid slurry medium contains lower boiling materials, e.g., olefins and conditioning ligands which are vaporized during the stripping and decomplexing phases.

In addition to the paraffins and monoolefins, other organic liquid diluents which can be present include, but are not limited to, the following classes of an specific materials: unsubstituted and alkyl substituted $C_6$ to $C_{18}$ aromatics (e.g., benzene, toluenes, xylenes, etc.), the corresponding halogenated aromatics; halogen-containing liquid aliphatic hydrocarbons (e.g., carbon tetrachloride, chloroform, methylene chloride, dichloroethane, difluoromonochloroethane, etc.). Such materials can be present, per se, or in admixture in amounts up to about 90 wt. percent of the total liquid diluent.

Generally, the inert liquid diluent employed is comprised predominantly of a paraffin containing from 3 to 16 carbon atoms, and having a higher boiling point than said conditioning ligand. Mixtures of two or more of such $C_3$ to $C_{16}$ paraffins can be used.

Usually, the paraffin diluent is one having the representative formula $C_{n+x}$ wherein $n$ is equal to the number of carbon atoms contained in the conditioning ligand and $x$ is an integer of from 1 to 12. Suitable inert liquid paraffin diluents which can be employed in the practice of this invention include, but are not limited to, the following: n-propane, n-butane, isobutane, n-pentane, isopentane, cyclopentane, n-hexane, isohexane, cyclohexane, n-heptane, isoheptane, n-octane, 2,4,4-trimethyl pentane, n-nonane, n-docane, n-undecane, n-dodecane, n-tridecane, n-tetradecane, n-pentadecane, n-hexadecane, their isomers and mixtures of any of said paraffins. For example, when the conditioning ligand is 1,3-butadiene the inert liquid paraffin can be one containing seven carbon atoms and the monoolefincomponent can contain at least one monoolefin having from four to seven carbon atoms. Preferably sufficient amounts of said inert liquid paraffin diluents are employed to reduce the solubility of the cuprous halide salt in any $$C_n^{+4}_{-2}$$

monoolefins (employed to accelerate the complexing rate) to the point where said cuprous halide salts are essentially insoluble in said monoolefins, viz., said monoolefins will dissolve less than 5 wt. percent cuprous halide salt, at the complexing-decomplexing conditions of temperature and pressure. Usually the slurry liquid diluent contains from about 15 to 85 wt. percent of the inert liquid paraffin(s).

Suitable conditioning ligands for use in the present invention are those compounds capable of forming stable cuprous halide complexes having a mole ratio of copper-to-complexing compound greater than 1:1 and preferably 2:1 or higher. The term "conditioning ligand" as employed herein with regard to the complexing step is intended to denote the presence of a compound containing a functional group capable of forming said complexes with any of the above mentioned cuprous halide sorbents. Such conditioning ligands include both the materials which form only complexes having said ratio of copper-to-complexing compounds, and compounds which form complexes having a ratio of 1:1 or less, but which upon decomplexing pass through a stable complex having the ratio of copper-to-complexing compound greater than 1:1. Thus, certain materials, e.g., nitriles, diolefins, acetylenes, carbon monoxide, etc., under ordinary conditions forming a 2:1 complex can be made to complex in ratios of copper to conditioning ligands of 1:1 or less. However, upon dissociation, complexing materials release selectively from the cuprous halide until the stable complex, viz., the complex having a copper to conditioning ligand ratio above 1:1, e.g., the 2:1 stoichiometric complex is completely formed before further decomplexing occurs. In this specification by "stable complex" is meant a stoichiometric complex stable upon dissociation as described in the preceding sentence. Suitable conditioning ligands contemplated herein include, but are not limited to, the following: $C_3$ to $C_{10}$ conjugated or nonconjugated, aliphatic or cyclic polyolefins, e.g., butadienes, isoprene, piperylene, allene, cyclohexadienes, octadienes, cyclooctadienes, cyclooctatetraenes, cyclododecatriene; $C_2$ to $C_{10}$ aliphatic, alicyclic, or aromatic acetylenes, or acetylenes containing additional unsaturation, e.g., acetylene, methyl acetylene, propyl acetylenes, phenyl acetylenes, vinyl acetylene, etc., $C_2$ to $C_{10}$ or higher saturated or unsaturated aliphatic, cyclic, or aromatic nitriles, e.g., acetonitriles, acrylonitrile, propiononitrile, phenylnitrile, methacrylonitrile, ethacrylonitrile, etc. The preferred conditioning ligand is 1,3-butadiene.

As noted hereinabove, it is also within the purview of this invention to employ in addition to the above conditioning ligands other materials in the slurry medium, esp., monoolefins which accelerate the rate at which the complex is formed, e.g., such monoolefins as indicated hereinabove by the formula $$C_n^{+4}_{-2}$$

wherein $n$=number of carbon atoms contained in the conditioning ligand. Moreover such monoolefin can be mixed with the conditioning ligand before contact with the cuprous halide salt or they can be added separately. Thus, e.g., where the conditioning ligand is 1,3-butadiene, the 1,3-butadiene-containing stream can also contain ethylenes, propylenes, butenes, pentenes, hexenes, heptenes, etc. The conditioning ligand-containing stream can contain other materials so long as the other materials do not adversely affect the formation of the desired cuprous halide-conditioning ligand complex. Thus it can contain (even substantial concentrations of) materials which complex with the cuprous halide salt but less preferentially than the conditioning ligand.

At the onset of the complexing stage of the process of this invention, the cuprous halide slurry contains the raw cuprous halide salt, the conditioning ligand, and any additional materials such as those referred to hereinabove, e.g., the $$C_n^{+4}_{-2}$$

monoolefins which assist in accelerating the complexation rate. The raw cuprous halide salt can account for from about 5 to 75 wt. percent of the total solids-liquid slurry. Usually, said slurry contains from about 30 to 70 wt. percent of the cuprous halide solids.

The conditioning ligand can be present in amounts ranging from about 0.3 to 90 wt. percent (based on total slurry liquids) and usually is present in concentrations ranging from about 5 to 50 wt. percent thereof during complexing. Preferably, the concentration of said conditioning ligand during complexing ranges from about 10 to 40 wt. percent of slurry liquid with the remaining 60 to 90 wt. percent being liquid diluent.

As noted hereinabove in accordance with the preferred embodiment of this invention, $$C_n^{+4}_{-2}$$

monoolefins are employed to accelerate the rate of complexation. In general, the liquid slurry diluent during complexing can contain said monoolefin(s) in concentrations ranging from about 0 to 85 wt. percent (based on total slurry liquid) during the complexing step. Subsequent to the completion of the complexing, these materials are preferably removed from the complex particles prior to decomplexation thereof. Usually, the concentration of said monoolefins based on slurry liquid at and during the complexing operation ranges from about 15 to 85 wt. percent. Other liquid diluent materials which are essentially inert to the complexing stage are usually present in amounts of less than about 5 wt. percent. In summary then the below table typifies the slurry compositional makeup:

|  | Slurry | | |
| --- | --- | --- | --- |
|  | Can contain | Usually contains | Preferably contains |
| Wt. percent solids in slurry (based on total of solids plus liquids). | 5 to 75 | 30 to 70 | 40 to 65. |
| Wt. percent organic liquid diluent (based on total slurry liquids at onset of complexing). | 10 to 99.7 | 50 to 95 | 60 to 90. |
| Wt. percent conditioning ligand (based on total slurry liquids on onset of complexing). | 0.3 to 90 | 5 to 50 | 10 to 40. |
| Wt. percent paraffin in diluent (based on total organic liquid diluent). | 10 to 100 | 15 to 85 | 35 to 80. |
| Wt. percent $C_n^{+4}{}_{-2}$ monoolefins in diluent (based on total organic liquid diluent). | 0 to 90 | 15 to 85 | 20 to 65. |
| Wt. percent of other materials in diluent, e.g., toluenes, methylene chloride, etc.; (based on total organic liquid diluent). | 0 to 90 | 0 to 70 | 0 to 40. |

The temperature and pressure conditions at which the complexing stage is conducted can be varied widely. However, it is desirable and even preferable to operate at conditions reasonably close to ambient temperature conditions. It should be noted here that the process of this invention can be operated batchwise or continuously. Generally, the complexing stage is conducted at temperatures ranging from about −20 to about 150° F. and pressures sufficient to maintain liquid phase complexing at these temperatures. Usually the temperatures range from about 0 to 130° F. and preferably from about 30 to about 110° F. The specific temperature and pressure conditions employed will vary according to the specific cuprous halide salt used, the specific conditioning ligand used, and the specific liquid diluent employed. For example, where the cuprous halide salt is cuprous chloride, the conditioning ligand is 1,3-butadiene, and the liquid diluent is predominantly n-pentane with some butenes; the temperatures at which complexation is conducted usually range from about 10 to 120° F. at pressures of 0 to 100 p.s.i.g.

Whether the active cuprous halide sorbent is prepared by batch (or "one-shot") or cyclic continuous procedures, it is preferable to employ more than the theoretical amount of the conditioning ligand necessary to complex with the cuprous halide salt. More preferably, approximately two or more times the theoretical amount of the conditioning ligand is employed.

The decomplexing step can be conducted at temperatures of about 120 to about 240° F. and pressures of about 0 to about 150 p.s.i.g. Usually, decomplexing is conducted at temperatures of about 150 to 230° F. and pressures of about 0 to 50 p.s.i.g. and preferably at temperatures of about 180 to 230° F. and pressures of about 10 to 30 p.s.i.a. Regardless of the specific temperatures and pressures used, the decomplexing is always conducted with the major portion of the inert liquid paraffin diluent being present as a liquid. Consequently, the decomplexing temperatures and pressures employed would be such so as to vaporize a minimum of said inert liquid paraffin diluent.

As indicated hereinabove, according to a preferred embodiment of this invention, a

monoolefin is used to attain faster rates of complexation during the complexing stage(s) of the process of this invention. When such as accelerating monoolefin is used, it is preferred to strip or wash the slurry solids and liquid substantially free of said monoolefin(s) after the complexation stage and prior to the decomplexation stage because said monoolefins present during decomplexation can cause some loss in porosity and sorptive capacity of the sorbent, possibly due to some solubilization of the sorbent at the decomplexation conditions. For example, when the paraffin diluent is n-pentane and the monoolefin(s) comprise butenes and the conditioning ligand is 1,3-butadiene, the complex cuprous halide particles can be vacuum stripped to remove butenes with the top of the stripper column at temperatures of about −20 to 50° F. and 1 to 20 p.s.i.a. (−14 to 5 p.s.i.g.) and the bottom of said column at temperatures of about 10 to 70° F. and pressures of 4 to 30 p.s.i.a. (−11 to 15 p.s.i.g.). When the paraffin diluent is n-heptane, and the monoolefin(s) comprise butenes and the conditioning ligand is 1,3-butadiene, the complexed cuprous halide particles can be stripped to remove butenes using butadiene gas as a stripping media at stripping temperatures at the top of the stripper column of 50 to 130° F. and pressures of 15 to 80 p.s.i.a. and the bottom of said column at temperatures of 80 to 180° F. and pressures of 17 to 85 p.s.i.a. Also the monoolefin(s) can be removed readily by extractive washing with essentially pure liquid paraffin diluent. For example, n-pentane can be used to remove pentenes and/or butenes after complexing and before decomplexing.

The active cuprous halide sorbent particles emanating as a product stream from the process of this invention are present in the form of a cuprous halide active sorbent slurried in said inert liquid diluent. Usually, said active sorbent-containing slurry contains from about 30 to 70 wt. percent of 5 to 200 micron particle size cuprous halide active sorbent. These sorbent particles are eminently suited for use in organuic liquid diluent slurry-based ligand recovery procedures to recover complexible ligands from mixtures containing them. If the sorbent particles prepared by this invention are to be so used, it is usually desirable in the sorbent preparation to employ an inert liquid paraffin diluent which is compatible to use in an organic liquid diluent slurry based ligand recovery procedure; although this is by no means necessary. In such a case it is desirable to use the same paraffin diluent in preparing the particles as will be used in the recovery process. The active sorbent particles prepared in accordance with this invention have not only a high initial sorptive capacity, but have a high capacity retention over repeated use, e.g., as demonstrated in 1,3-butadiene recovery processes whether they be slurry-based or non-slurry processes such as fluidized bed ligand recovery processes. In fact, it is a distinct advantage of this invention that active cuprous halide sorbent particles can be prepared in essentially the same particle size and distribution as that of the starting inactive salt and having sorptive capacities and retention thereof greater than can be customarily secured by solution-based sorbent preparation procedures.

The slurry particles produced according to this invention can be used directly as paraffin slurries of active sorbent in slurry recovery processes, or they can be dried if desired for use in fluid bed type recovery processes. In this case, cuprous halide salt of fluidizably desirable size would be used as the starting material to prepare final fluidizable size active sorbent particles. Moreover the cuprous halide salt can be activated by the instant slurry process using one liquid diluent then dried and then resuspended in another liquid diluent (employed in an organic diluent slurry recovery process).

EXAMPLE 1

Batch and continuous preparation of active sorbent from raw cuprous chloride salt—without monoolefin removal A batch activation of raw (commercial) cuprous chloride salt was carried out in a laboratory stirred one-liter vessel as follows. In the vessel were placed 200 g. of commercial raw cuprous chloride salt (98+% pure with <1% moisture) and 574 g. of n-pentane. The mixture was stirred and heated to 105° F. and 535 g. of a mixture of $C_4$ unsaturated hydrocarbons was fed to the vessel over a 4-hour period. The approximate composition of the $C_4$ hydrocarbon mixture was 35% 1,3-butadiene, 65% mixed $C_4$ monoolefins, consisting of approximately equal parts of isobutylene, 1-butene, and 2-butene. Stirring at 105° F. was continued for one hour. The complex was decomplexed in a stream of nitrogen at 165° F., liberating the 1,3-butadiene which was complexed with the cuprous chloride during activation. The 1,3-butadiene was condensed and measured. An amount of 1,3-butadiene equivalent to 56% of the theoretical quantity required for a one part 1,3-butadiene/2-part cuprous chloride complex was obtained showing activation of the raw salt to the 56% sorptive capacity level on a single cycle. The size distribution of the active cuprous chloride particles was essentially the same as that of the raw salt, showing that little or no growth or attrition had occurred.

| | Raw Salt | Activated CuCl |
|---|---|---|
| Particle Size, μ: | | |
| 0-10 | 0.9 | 4.3 |
| 10-20 | 14.9 | 16.7 |
| 20-50 | 37.3 | 41.8 |
| 50-80 | 29.4 | 27.7 |
| 80-100 | 3.9 | 2.2 |
| 100+ | 2.6 | 2.0 |

A similar activation of raw cuprous chloride was carried out in a continuous sorbent preparation operation. In this case, raw salt was added continuously to a pentane slurry containing partially activated cuprous chloride and a similar $C_4$ unsaturated hydrocarbon feed. In this case, the slurry was continually removed by overflow from the activation vessel, an average holding time in the activation vessel of 10–15 minutes was experienced by the cuprous chloride particles. A similar analysis of degree of activation to that described above was carried out, and showed that complexing at 35° F., an activation of 52% of theory could be obtained in the 15-minute holding time. In the continuous operation, higher complexing temperature, viz., 105° F., gave less activation at the same holding time.

EXAMPLE 2

Mixture of $$C_n^{+4}_{-2}$$

monoolefins as activation accelerators without monoolefin removal

A similar test to the batch laboratory example given above was carried out with a mixture of $C_4$ and $C_5$ monoolefins as activators. In this case 200 g. of raw commercial salt was slurried with 287 g. of pentene-1 and 287 g. of n-pentane. To this was added 284 g. of a mixture of $C_4$ unsaturated hydrocarbons, consisting of about 35% 1,3-butadiene, and 65% mixed butenes. An analysis (as in Example 1) of this activated cuprous chloride showed a sorptive capacity of 65% of theory. This complexing was conducted in only one and one-half hours at 105° F., as opposed to the five hours necessary for complexing to 56% with n-pentane and butenes at this temperature in the laboratory batch test of Example 1.

A one and one-half hour batch activation with n-pentane and butenes (no 1-pentene) results in only 30% capacity under these conditions.

The effect of 1-pentene is shown below over a wide concentration range.

ONE HOUR LABORATORY ACTIVATION, 105° F.

| Wt. percent butenes in liquid diluent (Ex. butadiene) | Wt. percent n-Pentane in liquid diluent (Ex. butadiene) | Wt. percent 1-pentane liquid diluent (Ex. butadiene) | Sorptive capacity of adsorbent (percent of theoretical) |
|---|---|---|---|
| 24 | 76 | 0 | 30 |
| 24 | 57 | 19 | 36 |
| 24 | 38 | 38 | 65 |

Further increases in total monoolefin content with increasing pentene-1 concentrations leads only to a disproportionately small increase in sorptive capacity per unit time to arrive at this capacity.

EXAMPLE 3

Slurry complexation with removal of monoolefins by paraffin wash or stripping before slurry decomplexation A laboratory cycle batch test was carried out to illustrate slurry phase complexation, slurry removal of the monoolefin(s), and slurry phase decomplexation.

For this test, a one-liter autoclave was charged with raw cuprous chloride salt and n-pentane. A $C_4$ hydrocarbon feed stream was added. This feed stream contained about 35% 1,3-butadiene and 65% mixed $C_4$ monoolefins as in Example 1. The complexation was carried out for 30 minutes at 30° F. The slurry liquid was washed and the butenes monoolefins were displaced with pure n-pentane in a manner such that the solids remained wet with liquid n-pentane throughout the washing. The slurry was then heated to 190° F. and decomplexation was carried out for 15 minutes. This cyclic complexation-washing-decomplexation was repeated several times as necessary to activate the salt to the desired level of sorptive capacity.

In another test, the inert slurry paraffin liquid employed was n-heptane, and the monoolefins were removed between the complexation and decomplexation steps by stripping the slurry with vapor 1,3-butadiene. Substantially the same results were obtained from the stripping as the washing techniques.

The detailed data given below refer to the washing technique using n-pentane as diluent liquid, except where otherwise indicated.

| | Monoolefin Removal Method | | | |
|---|---|---|---|---|
| | $C_5$; Wash | | $C_7$; Strip | |
| | Sorptive capacity | Activity [1] | Sorptive capacity | Activity [1] |
| Cycle: | | | | |
| 1 | 15 | 70 | ~15 | |
| 3 | 26 | 148 | ~30 | 180 |
| 4 | | | 45 | |
| 12 | | | 51 | |
| 18 | 41 | 299 | | |
| 23 | | | 55 | 365 |
| 38 | 66 | 371 | | |

[1] The term activity refers to an arbitrary laboratory test which measures the quality of the active sorbent in terms of its rate of complexation with 1,3-butadiene at a standard set of conditions. As defined, an active sorbent with a 100% activity would complex 1,3-butadiene in said laboratory test at a maximum rate of 10% complexed per minute. This test is conducted as follows. A small sample of the active sorbent under examination is placed on the pan of a Cahn microbalance. The balance is connected to an accurate recorder which continuously measures the weight of the sample. At a given temperature (50° F. in most instances) an atmosphere of $C_4$ unsaturated hydrocarbons containing about 35% 1,3-butadiene and 65% mixed butenes is allowed to contact the sample. The active sorbent sample complexes with the 1,3-butadiene, increasing the weight, and the weight increase is recorded as a function of time. The weight increase is converted mathematically to a reaction rate according to the below equation:

Reaction rate per minute =

$$\frac{\text{weight of butadiene complexed in one minute} \times 0.367}{\text{weight of cuprous halide sorbent before complexing}} \times 100$$

An active sorbent sample which complexed at a maximum rate of 10% complexed per minute was arbitrarily given a rating of 100% activity.

EXAMPLE 4

Advantage for removal of monoolefins before decomplexation

A laboratory test was conducted to determine the effect of monoolefin concentration in the slurry liquid during decomplexation on the loss of complexation activity [1] during decomplexation. In this series of tests, active sorbents prepared as in Example 1 where complexed slurry phase with 1,3-butadiene. The solids were then subjected to decomplexation tests at 170° F. in slurry diluents, comprising n-pentane and varying amounts of monoolefins. The initial activity [1] of the solid for complexing 1,3-butadiene was measured in a laboratory test, and is reported below as an arbitrary percentage activity. After decomplexation, the sorbents were again tested for activity. The comparisons are given in the table below.

170° F. SLURRY DECOMPLEXATION n-PENTANE AS INERT PARAFFIN DILUENT 5-MINUTE HOLDING TIME

| | Activity | Sorptive capacity |
|---|---|---|
| Initial | 251 | 49 |
| Decomplexed, percent butenes in n-Paraffin diluent: | | |
| 0 | 250 | 46 |
| 1.5 | 113 | 37 |
| 5 | 92 | 36 |
| 10 | 42 | 33 |

These data show that it is desirable to remove the monoolefins from the slurry solids and liquid before decomplexation to maintain a high quality sorbent during the recomplexation, and not lose some of the adsorbtive capacity that was gained during the complexation.

EXAMPLE 5

Comparison for vinyl acetylene rejection capacity attained by use of sorbent prepared according to the present invention vs. sorbent prepared by solution preparation procedure Samples of active cuprous chloride sorbent prepared in slurry by Example 1 and by a solution procedure, as described wherein raw cuprous chloride was dissolved in isobutylene, and reprecipitated by addition of 1,3-butadiene, separated, dried, and decomplexed, were compared as to the purity of 1,3-butadiene product which results from their use in a 1,3-butadiene pentane slurry based recovery operation conducted in accordance with the procedure indicated below. In each case, the active cuprous chloride was treated in a laboratory complexation step as follows.

In a laboratory batch autoclave was slurried 150 g. of the active cuprous chloride particles in 300 ml. of n-pentane. Approximately 100 g. of a mixture of predominantly (>99 wt. percent) $C_4$ unsaturated hydrocarbons (about 35% 1,3-butadiene and 65% mixed butenes) was added over 30 minutes at 90° F. The active cuprous chloride particles were evaluated for amount of complexation as in Example 1. The 1,3-butadiene product from the two different active cuprous chlorides was collected and compared by critical gas chromatographic analysis for purity, in particular for vinyl acetylene, which is a contaminant difficult to remove from 1,3-butadiene.

| Active CuCl | This invention | Solution prep. |
|---|---|---|
| Product Purity: | | |
| 1,3-butadiene, wt. percent | 99.9 | 99.9 |
| Vinyl acetylene, p.p.m.[1] | 9 | 41 |

[1] These comparisons were made at the 1,100 p.p.m. vinyl acetylene vel in the unsaturate feed stream.

[1] The term activity as used herein is the same as that used in Example 3.

The lower quantity of vinyl acetylene in the product from the active cuprous chloride of this invention is probably due to lower impurities in this sorbent. The lower impurities are possibly due to less contact with the atmosphere, as complexation and decomplexation can be carried out in the slurry phase with the sorbent particles surrounded by liquid diluent. With the solution preparation particles, a drying and vapor phase decomplexation are necessary to obtain the active cuprous chloride. This can sometimes result in the formation of cupric chloride and its hydrate by exposure to the atmosphere. Vinyl acetylene complexes preferentially with cupric chloride present in the active sorbent, i.e. more preferentially than does butadiene-1,3.

What is claimed is:

1. A process for directly preparing sorption-active cuprous halide sorbents selected from the group consisting of cuprous chloride, cuprous bromide and cuprous iodide from the corresponding raw cuprous halide salts by (1) contacting (A) a slurry of raw cuprous halide salt particles selected from the group consisting of cuprous chloride, cuprous bromide and cuprous iodide in an organic liquid slurry medium comprising at least 10 wt. percent of an inert, liquid paraffin diluent and, from 0 to 90 percent of other organic liquid diluents, in which said cuprous halide is essentially insoluble with (B) a conditioning ligand capable of forming a stable complex with said cuprous halide, said cuprous halide accounting for from about 5 to 75 wt. percent of the total solids-liquids slurry, and having a mole ratio of copper-to-conditioning ligand of greater than 1:1, at temperature and pressure conditions suitable for liquid phase complexation, said inert paraffin diluent having a higher boiling point than said conditioning ligand, and (2) thereafter subjecting said cuprous halide-conditioning ligand complex particles to temperature and pressure conditions sufficient to decomplex said particles while retaining said inert paraffin diluent in the liquid state.

2. A process as in claim 1 wherein a $$C_n^{+4}_{-2}$$

liquid monoolefin component, in concentration ranging from about 0 to 85 wt. percent, is present in said slurry liquid medium during complexing, C representing a carbon atom, $n$ representing the number of carbon atoms in said conditioning ligand, the $$+4 \atop -2$$

designating a monoolefin having from two less carbon atoms to four more carbon atoms than the conditioning ligand.

3. A process as in claim 1 wherein said cuprous halide is cuprous chloride.

4. A process as in claim 1 wherein said conditioning ligand is a multiolefin.

5. A process as in claim 4 wherein said multiolefin is a diolefin.

6. A process as in claim 5 wherein said diolefin is 1,3-butadiene.

7. A process as in claim 1 wherein said inert liquid paraffin diluent contains $C_{n+x}$ carbon atoms where $n$ represents the number of carbon atoms in said conditioning ligand and $x$ is an integer of from 1 to 12.

8. A process as in claim 7 wherein said inert paraffin diluent contains a paraffin having five carbon atoms.

9. A process as in claim 8 wherein said conditioning ligand is 1,3-butadiene.

10. A process as in claim 2 wherein said conditioning ligand is 1,3-butadiene and said monoolefin component contains a monoolefin having four carbon atoms.

11. A process as in claim 2 wherein said conditioning ligand is 1,3-butadiene and said monoolefin component contains a monoolefin having five carbon atoms.

12. A process as in claim 7 wherein said inert paraffin diluent contains a paraffin having seven carbon atoms.

13. A process as in claim 1 wherein said complexing is conducted at temperatures of about −20 to about 150° F.

14. A process as in claim 1 wherein said decomplexing is conducted at temperatures of about 120 to about 240° F.

15. A process as in claim 2 wherein said liquid monoolefin component is substantially removed from said complexed particles prior to decomplexation thereof while said inert liquid paraffin diluent is maintained in the liquid state.

16. A process as in claim 15 wherein said monoolefin removal is conducted by washing the complexed slurry with a paraffin.

17. A process as in claim 15 wherein said monoolefin removal is conducted by heating the complexed slurry.

18. A process as in claim 1 wherein said slurry contains from about 5 to about 75 wt. percent of said cuprous halide particles.

19. A process as in claim 1 wherein the total slurry liquids contained from about 0.3 to about 90 wt. percent of said conditioning ligand on initiation of complexing.

20. A process as in claim 1 wherein the said other organic liquid diluent is a monoolefin.

21. A process as in claim 1 wherein said active cuprous halide sorbent preparation process is conducted continuously by repeatedly complexing and decomplexing sequentially.

22. A process as in claim 1 where the liquid phase slurry complexing is carried out continuously at temperatures ranging from about 0 to 130° F.

23. A process as in claim 1 wherein said raw cuprous halide salt is within the fluidizable particle size range and said active cuprous halide sorbent is within the fluidizable particle size range and said active sorbent particles are dried after decomplexation.

24. A process as in claim 2 wherein said conditioning ligand is 1,3-butadiene and said monoolefin component contains a mixture of $C_4$ and $C_5$ monoolefins.

25. A process as in claim 2 wherein said conditioning ligand is 1,3-butadiene, said inert liquid paraffin diluent is one containing seven carbon atoms and said monoolefin component contains at least one monoolefin having from four to seven carbon atoms.

References Cited

UNITED STATES PATENTS

| | | |
|---|---|---|
| 2,398,647 | 11/1945 | Soday. |
| 3,080,437 | 3/1963 | Scofield et al. |
| 3,268,614 | 8/1966 | Long. |
| 3,340,004 | 9/1967 | Hunter et al. _____ 23—97 |
| 2,116,151 | 5/1938 | Ipatieff _____ 196—10 |

PATRICK P. GARVIN, Primary Examiner

U.S. Cl. X.R.

260—681.5